(12) United States Patent
    LaBine et al.

(10) Patent No.: US 12,568,317 B2
(45) Date of Patent: Mar. 3, 2026

(54) UNDERWATER CAMERA SYSTEM

(71) Applicant: TidalX AI Inc, San Ramon, CA (US)

(72) Inventors: Anne LaBine, San Francisco, CA (US);
               Samuel Gregory, San Jose, CA (US);
               Bianca Bahman, San Francisco, CA
               (US); Terry Allan Smith, Saratoga, CA
               (US)

(73) Assignee: TidalX AI Inc., Mountain View, CA
              (US)

( * ) Notice: Subject to any disclaimer, the term of this
             patent is extended or adjusted under 35
             U.S.C. 154(b) by 189 days.

(21) Appl. No.: 18/451,706

(22) Filed: Aug. 17, 2023

(65) Prior Publication Data

US 2024/0061321 A1    Feb. 22, 2024

Related U.S. Application Data

(60) Provisional application No. 63/398,615, filed on Aug.
    17, 2022.

(51) Int. Cl.
    *H04N 23/90*    (2023.01)
    *G03B 17/08*    (2021.01)
    *G03B 17/56*    (2021.01)
    *H04N 23/51*    (2023.01)
    *H04N 23/66*    (2023.01)

(52) U.S. Cl.
    CPC ............. *H04N 23/90* (2023.01); *G03B 17/08*
              (2013.01); *G03B 17/561* (2013.01); *H04N*
              *23/51* (2023.01); *H04N 23/66* (2023.01)

(58) Field of Classification Search
    CPC ...... G03B 17/08; G03B 17/561; H04N 23/66;
              H04N 23/51; H04N 23/695; H04N 23/90
    See application file for complete search history.

(56) References Cited

U.S. PATENT DOCUMENTS

| | | | | |
|---|---|---|---|---|
| 2001/0045183 A1* | 11/2001 | Geriene | ................... | B63G 8/42 |
| | | | | 114/312 |
| 2018/0043978 A1* | 2/2018 | Fang | ......................... | B63G 8/42 |
| 2018/0054598 A1* | 2/2018 | Maschhoff | ............... | H04N 7/18 |
| 2018/0284575 A1 | 10/2018 | Sugaki et al. | | |
| 2021/0080715 A1 | 3/2021 | Saxena et al. | | |

FOREIGN PATENT DOCUMENTS

| | | |
|---|---|---|
| DE | 10310550 | 9/2004 |
| WO | WO 2011/143622 | 11/2011 |

OTHER PUBLICATIONS

International Preliminary Report on Patentability in International
Appln. No. PCT/US2023/030483, mailed on Feb. 4, 2025, 8 pages.
International Search Report and Written Opinion in International
Appln. No. PCT/US2023/030483, dated Dec. 4, 2023, 14 pages.

* cited by examiner

*Primary Examiner* — Stephanie E Bloss
*Assistant Examiner* — Fang-Chi Chang
(74) *Attorney, Agent, or Firm* — Fish & Richardson P.C.

(57)    ABSTRACT

An underwater camera system includes a camera assembly
configured to scan a seabed while submerged under water
and moving in a direction of travel. A buoyant support is
coupled to the camera assembly and configured to position
the camera assembly under water during the moving in the
direction of travel. A stabilization assembly is coupled to the
camera assembly and configured for adjusting an orientation
of the camera assembly relative to the direction of travel.

20 Claims, 4 Drawing Sheets

UNDERWATER CAMERA SYSTEM

CROSS REFERENCE TO RELATED APPLICATION

This application claims the benefit of U.S. Patent Application Ser. No. 63/398,615, filed on Aug. 17, 2022, the entire contents of which are hereby incorporated by reference.

TECHNICAL FIELD

The present disclosure relates to an underwater camera system.

BACKGROUND

Researchers often find determining biomass of seagrass difficult. A manual process of retrieving samples is often used to estimate the size and weight of a large quantity of seagrass in an area. However, such a process is unsustainable, time-consuming, inaccurate, and requires substantial financial, logistical, and human resources.

SUMMARY

The present disclosure relates to an underwater camera system and floating camera assembly that is configured to substantially maintain a horizontal orientation while measuring and monitoring a seabed.

In accordance with a first aspect, an underwater camera system may include a camera assembly configured to scan a seabed while submerged under water and moving in a direction of travel. A buoyant support may be coupled to the camera assembly and configured to position the camera assembly under water during the moving in the direction of travel. A stabilization assembly may be coupled to the camera assembly and may be configured for adjusting an orientation of the camera assembly relative to the direction of travel.

In accordance with a second aspect, a floating camera assembly may include a frame having a first end and an opposite second end. A camera may be mounted to the first end of the frame. A buoyant support may carry the frame and may be configured for suspending the frame and the camera under water. The frame may be configured for resisting rotation and translation of the camera when the camera is submerged under water.

In accordance with a third aspect, a method of operating an underwater camera assembly may include submerging a camera assembly underwater. The camera assembly may be configured to scan a seabed while submerged under water and moving in a direction of travel. The method may include positioning the camera assembly at a depth under water using a buoyant support. The buoyant support may be coupled to the camera assembly. The method may include maintaining an orientation of the camera assembly in parallel with a direction of travel.

In further accordance with any one or more of the foregoing first, second, and third aspects, an underwater camera system, a floating camera assembly, and/or a method of operating an underwater camera system may further include any one or more of the following aspects.

In one example, the camera assembly may include a frame oriented in parallel relative to the direction of travel.

In another example, the frame may be configured to resist rotation and translation of the camera assembly when the camera assembly is submerged under water.

In other examples, the stabilization assembly may include a damper coupled to the frame to resist translation of travel of the camera assembly in the direction of travel.

In another example, the stabilization assembly may include a damper coupled to the frame to resist translation of travel of the camera assembly in a direction perpendicular to the direction of travel.

In some examples, a coupling mechanism may connect the frame of the camera assembly to the buoyant support.

In one form, the coupling mechanism may connect a first end of the buoyant support to a first end of the frame.

In another form, the coupling mechanism may connect a second end of the buoyant support to a second end of the frame.

In another form, the camera assembly may include a stereo camera mounted to a first end of the frame.

In some forms, the stereo camera may have a first field of vision.

In another form, the stereo camera may have a second field of vision perpendicular relative to the first field of vision.

In other forms, the camera assembly may include a second camera mounted to a second end of the frame opposite the first end.

In one form, an inertial measurement unit may be coupled to the frame.

In another example, a fin may be coupled to the frame.

In other examples, the system may include a power source and an electrical cord coupling the camera assembly to the power source.

In some examples, camera assembly may be communicatively coupled to a controller.

In other examples, the controller may be configured to operate the camera assembly.

In one form, the buoyant support may include a support frame and a floating device coupled to the support frame.

In another form, buoyant support may include a fin coupled to the support frame.

In some forms, a second camera may be mounted to the second end of the frame.

In other forms, a damper may be coupled to the frame to resist rotation of the frame.

In one form, a means for adjusting an orientation of the camera assembly may be coupled to the camera assembly.

In one aspect, a coupling mechanism may connect the frame in parallel with the buoyant support when the frame is submerged under water.

In another aspect, the method may include adjusting the orientation of the camera assembly.

In some aspects, adjusting the orientation of the camera assembly may include maneuvering a line connected to a frame holding a camera of the camera assembly.

In other aspects, the method may include controlling the camera assembly using a remotely operated controller, the controller communicatively coupled to one or more cameras of the camera assembly.

In one aspect, the method may include scanning the seabed using a stereo camera comprising a first field of vision and a second field of vision different than the first field of vision.

In on example, scanning the seabed may include scanning using a second camera comprising a third field of vision different than the first field of vision and the second field of vision of the stereo camera.

Definitions

As used herein, the term "about" means+/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the present disclosure will be apparent from the following detailed description, the figures, and the claims.

BRIEF DESCRIPTION OF THE DRAWINGS

The following drawings illustrate certain embodiments of the features and advantages of this disclosure. These embodiments are not intended to limit the scope of the appended claims in any manner. Like reference symbols in the drawings indicate like elements.

DETAILED DESCRIPTION

Figure 1:
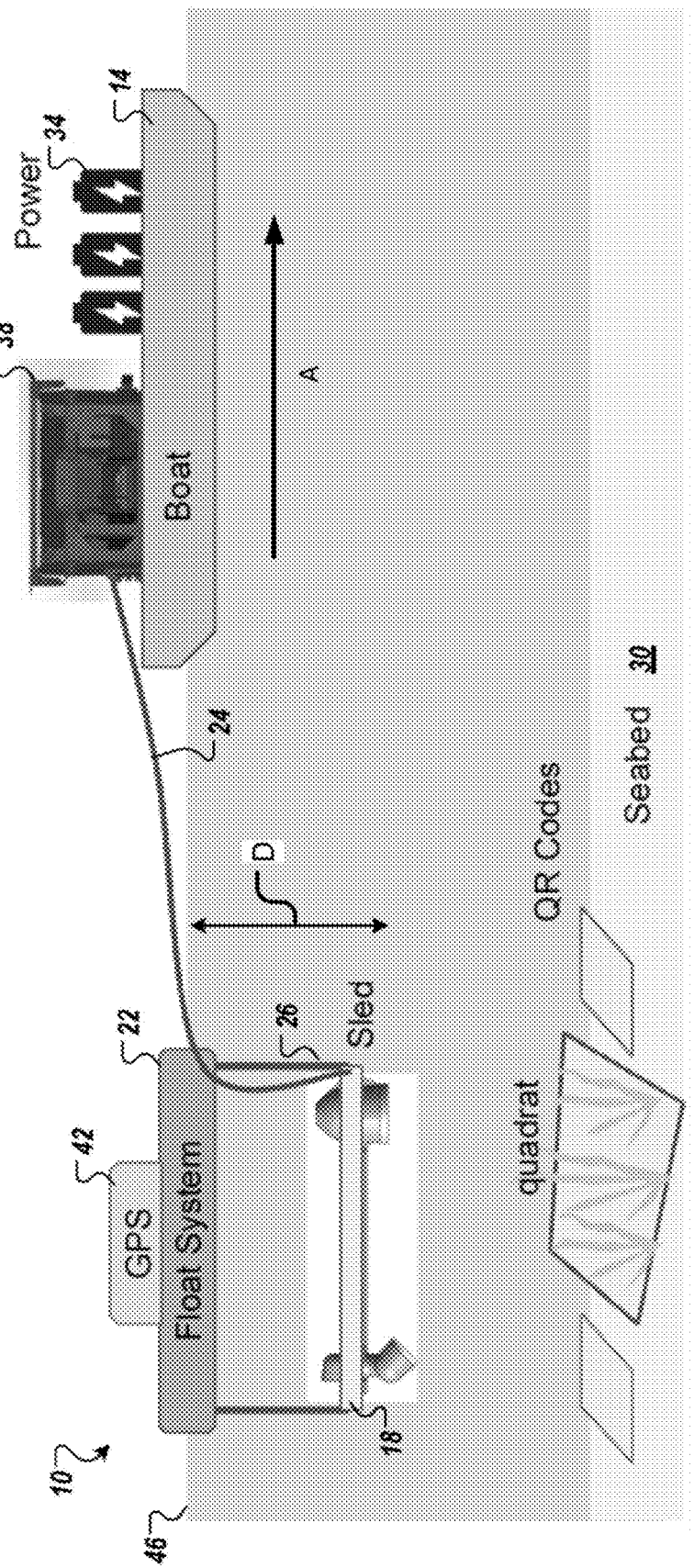
FIG. 1 is a schematic diagram of an example underwater camera system pulled by a boat in accordance with the teachings of the present disclosure.

The present disclosure relates to an underwater camera system that substantially maintains a horizontal orientation while measuring and monitoring a seabed. FIG. 1 illustrates an example underwater camera system 10 in accordance with the teachings of the present disclosure. The underwater camera system 10 is at least partially submerged underwater and is pulled by a boat 14 in a direction A. The system 10 includes a camera assembly 18, a buoyant support 22 coupled to the camera assembly 18, and a stabilization assembly 26 coupled to the camera assembly 18. The stabilization assembly 26 includes a line 24 that connects the camera assembly 18 to the boat 14 so that the boat tows the camera assembly 14 over a target area, such as a seabed or seagrass meadow. As will be discussed in detail below, the line 24 of the stabilization assembly 26 helps orient and/or adjust the camera assembly 18 during operation.

According to the orientation of FIG. 1, the camera assembly 18 faces downward toward the seabed 30 and is substantially parallel to horizontal or to a direction of travel A. The camera assembly 18 includes one or more cameras and sensors that are configured to monitor, detect, image, and/or scan a seabed 30 while submerged under water and moving in the direction of travel A. The system 10 optionally includes a GPS device 42 disposed above a water level 46 and coupled to the buoyant support 22. The boat 14 is equipped with a power source 34 and control box 38 that is communicatively coupled to the camera assembly 18 to operate one or more cameras of the camera assembly 18. However, in other examples, the camera assembly 18 may be towed by a different aquatic vehicle or movable floatation device with or without electronics for controlling and operating the camera assembly 18.

Figure 2:
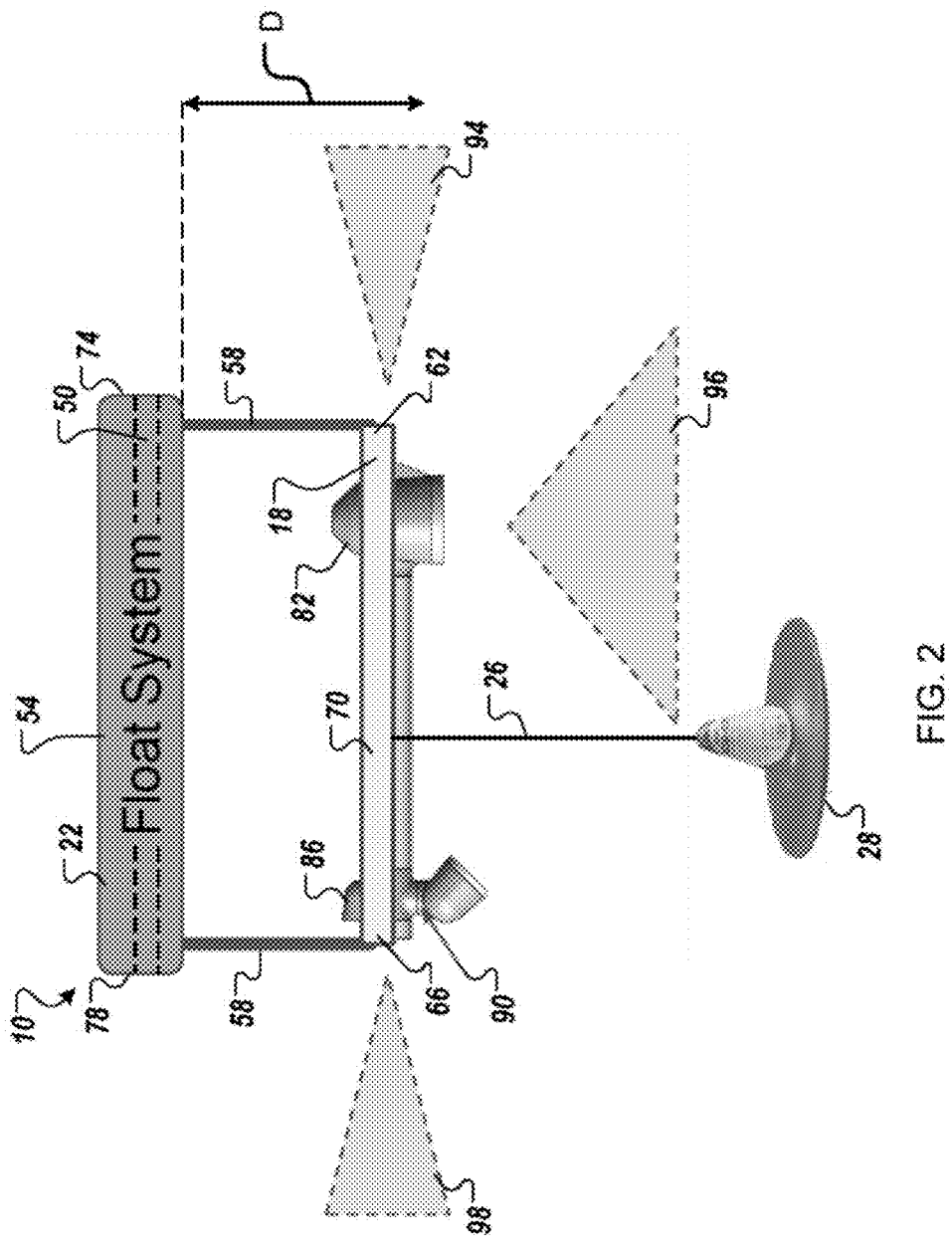
FIG. 2 is the underwater camera system of FIG. 1.

In FIG. 2, the buoyant support 22 and camera assembly 18 are arranged in parallel. The buoyant support 22 includes a support frame 50 and a floating device 54 coupled to the support frame 50 configured for positioning at least partially above the water level. In operation, the buoyant support 22 is configured to position the camera assembly 14 under water at a particular depth during the moving in the direction of travel A. A coupling mechanism 58 connects the camera assembly 18 to the buoyant support 22 at a fixed distance D so that the camera assembly 18 remains at a certain depth below the water line. The coupling mechanism 58 may be flexible (e.g., cords, tethers, rope, lines) or rigid (e.g., brackets, tubing, pipes) ties, and may be adjustable to change the distance D between the buoyant support 22 and the camera assembly 18.

The camera assembly 18 includes a first end 62 (or leading end with respect to the direction of travel), an opposite second end 66 (or trailing end), a frame 70, and one or more cameras and sensors. The coupling mechanism 58 connects a first end 74 of the buoyant support 22 to the first end 62 of the frame 70 and a second end 78 of the buoyant support 22 to the second end 66 of the frame 70. First and second cameras 82, 86 and/or one or more sensors 90 are strategically mounted to the frame 70 of the camera assembly 18 to achieve optimal visibility and detection of the seabed. The frame 70 of the camera assembly 18 is oriented in parallel relative to the direction of travel A to maintain orientation of the first camera 82 and second camera 86 relative to the seabed. The frame 70 may be constructed using one or more metal hollow or solid rails, e.g., PVC pipes or aluminum T-slotted framing rails.

In the illustrated example, the camera assembly 18 includes two cameras 82, 86 oriented in different directions to estimate seagrass height, volume, coverage, density, identify seagrass species. The first camera 82 is mounted to the frame 70 at first end 62 of the camera assembly 18 and the second camera 86 is mounted to the frame 70 at the second end 66 of the camera assembly 18. The first camera 82 is a stereo camera having first and second fields of vision 94, 96, and the second camera 86 has a third field of vision 98 different than the first and second fields of vision 94, 96 of the stereo camera 82. The second field of vision 96 is directed toward the seabed and is possible due to the horizontal orientation of the camera assembly 18. Further, the camera assembly 18 includes one or more sensors 90 (e.g., inertial measurement unit ("IMU"), a depth sensor, temperature sensor, and/or ultrasonic sensor) to measure depth, sound, temperature, speed, acceleration, movement, light, salinity, pH, and/or other measurements related to the seagrass, seabed, or surrounding environment. In another example, the first camera has one field of vision, and the assembly 18 includes a third camera, providing three fields of vision. In other examples, the camera assembly 18 may include more or fewer cameras and/or sensors.

The stabilization assembly 26 is coupled to the frame 70 to resist rotation and translation of the camera assembly 18 when the camera assembly 18 is submerged under water. The stabilization assembly 26 includes the line 24 and one or more dampers 28 coupled to the frame 70 to resist translation of travel of the camera assembly 18 in the direction of travel or in a direction perpendicular to the direction of travel.

Figure 3:
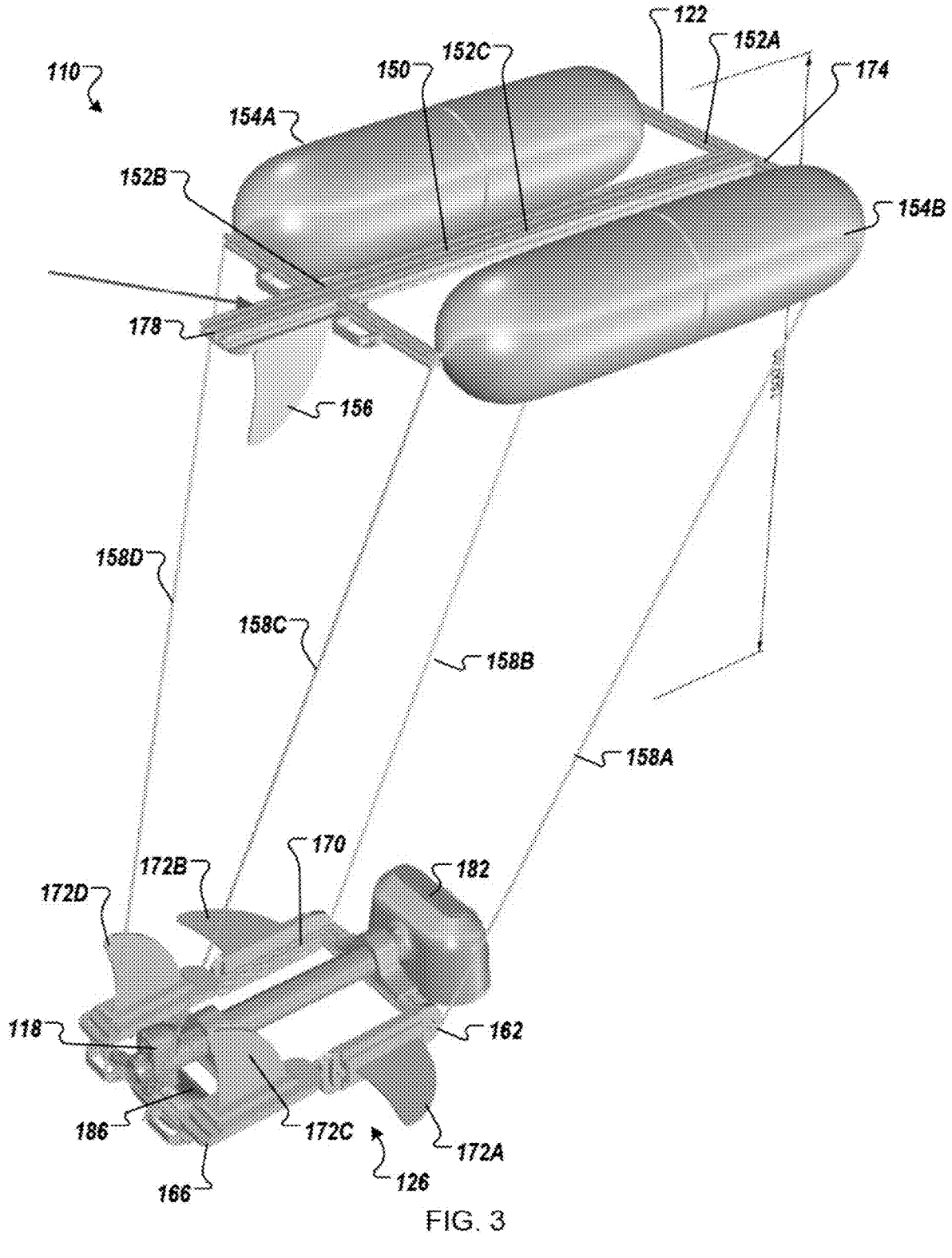
FIG. 3 is a different example underwater camera system assembled in accordance with the teachings of the present disclosure.
Figure 4:
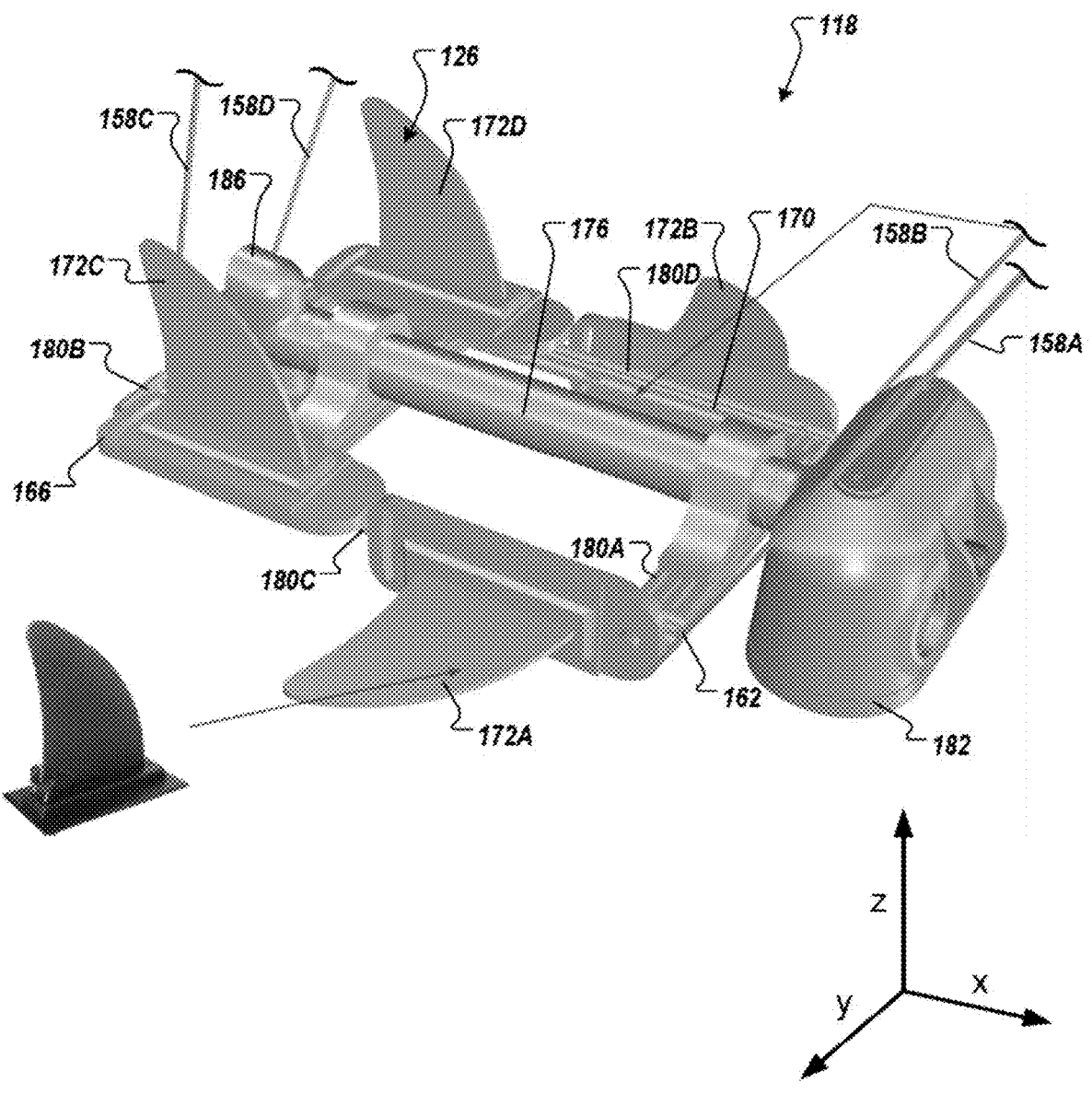
FIG. 4 is a camera assembly of the underwater camera system of FIG. 3.

FIGS. 3 and 4 illustrate another example underwater camera system 110 in accordance with the teachings of the present disclosure. The second example underwater camera system 110 is similar to the first example underwater camera system 10 of FIGS. 1-2, and also includes a camera assembly 118, a buoyant support 122, and coupling mechanism 158. Thus, for ease of reference, and to the extent possible, the same or similar components and features of the second example underwater camera system 110 will retain the same reference numbers as outlined above with respect to the first example underwater camera system 10, although the reference numbers will be increased by 100.

The buoyant support 122 of the underwater camera system 10 includes a frame 150 and first and second floating devices 154A, 154B coupled to the frame 150. The floating devices 154A, 154B may include, for example, a trap float, dock float, buoy, balloon, bladder, or a combination of one or more floating devices. The frame 150 includes first and second cross bars 152A, 152B and a perpendicular rail 152C connecting the parallel cross bars 152A, 152B. The cross bars 152A, 152B and rail 152C may be made of the same or different material, such as, for example, PVC or aluminum extrusion-based frame rails. At a second end 178 of the buoyant support 122, a fin 156 extends downward to provide stability and/or steering capabilities. The fin 156 may be a detachable, rotatable fin made of extrudable plastic or rubber that can be angled, adjusted, and stowed.

Four lines 158A-D couple the buoyant support 122 to the camera assembly 118. Each of these lines 158A-D is coupled to a corner of a generally rectangular frame 170. The lines 158A-D may be manipulated (i.e., slacked or pulled in tension) to raise or lower a front right corner, a front left corner, a back right corner, and a back left corner of the frame 170. By adjusting the lines, the orientation of the frame 170 may be adjusted to position first and/or second cameras of the camera assembly 118 in a desired location or orientation.

The system 110 includes similar fins 172A-D attached to the frame 170 of the camera assembly 118. The fins 172A-D may be positioned in parallel with the direction of travel (i.e., the first and second fins 172A, 172B at a first end 162) and/or perpendicular to the direction of travel (i.e., the third and fourth fins 172C, 172D at the second end 166). The fins 172C-D may be individually detached, rotated, angled, adjusted, and/or stowed. The frame 170 includes a first rail 180A at the first end 162, a second, parallel rail 180B at the second end 166, and third and fourth rails 180C, 180D connecting, and oriented perpendicular relative to, the first and second rails 180A, 180C. A cylindrical tube 176 extends from a first camera at the first end of the camera assembly to a second camera at the second end of the camera assembly. The frame may be weighted to balance the camera assembly and resist rotation and/or translation in the x-, y-, and z-directions. The system 110 may optionally include one or more sensors.

The present disclosure encompasses methods of operating underwater camera assemblies 10, 110. One example method, which will be described with respect to the first example underwater camera system 10, includes a step of submerging a camera assembly 18 underwater, or below the water line 46. The camera assembly 18, which may be the camera assembly 118 FIG. 3, is configured to scan a seabed 30 while submerged under water and moving in a direction of travel A. Another step of the method includes positioning the camera assembly 18 at a depth D under water using a buoyant support 22, wherein the buoyant support 22 is coupled to the camera assembly 18. Further, an additional step includes maintaining an orientation of the camera assembly 18 in parallel with a direction of travel A. In other words, the camera assembly 18 is oriented parallel to horizontal. This may further include a step of adjusting the orientation of the camera assembly 18.

The present disclosure contemplates many different methods and mechanisms for adjusting the orientation of the camera assembly 18. For example, adjusting the orientation may include maneuvering a line 24 connected to a frame 70 holding a camera 82 of the camera assembly 18. The line 24 may include a plurality of lines connected to different portions of the camera assembly 18 so that if one line is pulled, the camera assembly 18 may be tilted up, and if another line is pulled, the camera assembly 18 may be tilted down. For example, one or more lines may be coupled to the coupling mechanism 58 coupling the frame 70 to the buoyant support 22. In another example, one or more lines may correspond with the four different lines 158A-D of the second example camera assembly 118. Various lines may be coupled to the frame 70 of the camera assembly 18 to translate or rotate the orientation of the camera assembly along or about x-, y-, and z-directions. In other examples, one or more fins (e.g., fins 172A-D of the second example camera assembly 118) may be coupled to the frame 70 and may be operated to tilt, rotate, or steer the camera assembly 18 to occupy a desired orientation. Further, in other examples, the camera assembly 18 may include one or more propellers used to adjust the orientation of the camera assembly 18. Other means for adjustment may include dampers, counterweights, or other mechanisms coupled to the frame 70.

The method also includes a step of controlling the camera assembly 18 using a remotely operated controller coupled to the control box 38. The controller may be communicatively coupled to one or more cameras 82, 86 of the camera assembly 18. Controlling the camera assembly 18 may include a step of scanning the seabed 30 using a stereo camera 82 comprising a first field of vision 94 and a second field of vision 96 different than the first field of vision 94. This step may also include scanning the seabed 30 using a second camera 86 comprising a third field of vision 98 different than the first field of vision 94 and the second field of vision 96 of the stereo camera 82.

Whilst the invention has been disclosed in particular embodiments, it will be understood by those skilled in the art that certain substitutions, alterations and/or omissions may be made to the embodiments without departing from the spirit of the invention. Accordingly, the foregoing description is meant to be exemplary only, and should not limit the scope of the invention. All references (including those listed above), scientific articles, patent publications, and any other documents cited herein are hereby incorporated by reference for the substance of their disclosure.

The invention claimed is:

1. An underwater camera system, comprising:
   a camera assembly configured to scan a seabed while submerged under water and moving in a direction of travel;
   a buoyant support coupled to the camera assembly and configured to position the camera assembly under water during the moving in the direction of travel; and
   a stabilization assembly coupled to the camera assembly, the stabilization assembly comprising a plurality of lines connecting the camera assembly to the buoyant support that are manipulable to raise or lower a portion of the camera assembly to adjust an orientation of the camera assembly relative to the direction of travel.

2. The system of claim 1, wherein the camera assembly comprises a frame that is configured to resist rotation and translation of the camera assembly when the camera assembly is submerged under water.

3. The system of claim 1, wherein the stabilization assembly comprises a damper coupled to the camera assembly to resist translation of travel of the camera assembly in the direction of travel or in a direction perpendicular to the direction of travel.

4. The system of claim 1, wherein the plurality of lines connecting the camera assembly to the buoyant support connects a first end of the buoyant support to a first end of a frame of the camera assembly and a second end of the buoyant support to a second end of the frame.

5. The system of claim 1, wherein the camera assembly comprises a stereo camera, wherein the stereo camera has a first field of vision and a second field of vision perpendicular relative to the first field of vision.

6. The system of claim 1, comprising an inertial measurement unit or a fin coupled to a frame of the camera assembly.

7. The system of claim 1, comprising a power source and an electrical cord coupling the camera assembly to the power source.

8. The system of claim 1, wherein the camera assembly is communicatively coupled to a controller, the controller configured to operate the camera assembly.

9. The system of claim 1, wherein the buoyant support comprises a support frame and a floating device coupled to the support frame wherein the buoyant support comprises a fin coupled to the support frame.

10. The system of claim 1, wherein the plurality of lines connecting the camera assembly to the buoyant support comprise:

a first line connecting the buoyant support to a first corner of the camera assembly;

a second line connecting the buoyant support to a second corner of the camera assembly, wherein the second corner is different from the first corner;

a third line connecting the buoyant support to a third corner of the camera assembly, wherein the third corner is different from the first corner and the second corner; and a fourth line connecting the buoyant support to a fourth corner of the camera assembly, wherein the fourth corner is different from each of the first corner, the second corner, and the third corner.

11. The system of claim 1, wherein the camera assembly comprises a frame, wherein the frame includes a set of weights that resist at least one of rotation or translation relative to the direction of travel.

12. A floating camera assembly, the assembly comprising:

a frame having a first end and a second end opposite the first end;

a camera mounted to the first end of the frame;

a buoyant support carrying the frame and configured for suspending the frame and the camera under water; and wherein the frame is connected to the buoyant support by a plurality of lines that are manipulable to raise or lower a portion of the frame to adjust an orientation of the camera when the camera is submerged under water.

13. The assembly of claim 12, comprising a second camera mounted to the second end of the frame.

14. The assembly of claim 12, comprising a coupling mechanism connecting the frame in parallel with the buoyant support when the frame is submerged under water, wherein the coupling mechanism includes the plurality of lines that are manipulable to raise or lower the portion of the frame to adjust the orientation of the camera when the camera is submerged under water.

15. The assembly of claim 12, comprising a damper coupled to the frame to resist rotation of the frame.

16. The assembly of claim 12, comprising a means for adjusting the orientation of the camera assembly, the means for adjusting being coupled to the camera assembly.

17. A method of operating an underwater camera assembly, the method comprising:

submerging a camera assembly underwater, the camera assembly configured to scan a seabed while submerged under water and moving in a direction of travel;

positioning the camera assembly at a depth under water using a buoyant support, wherein the buoyant support is coupled to the camera assembly by a plurality of lines connecting the camera assembly to the buoyant support that are manipulable to raise or lower a portion of the camera assembly to adjust an orientation of the camera assembly; and maintaining, using the plurality of lines connecting the camera assembly to the buoyant support, the orientation of the camera assembly corresponding to the direction of travel.

18. The method of claim 17, comprising adjusting the orientation of the camera assembly, wherein adjusting the orientation of the camera assembly comprises manipulating the plurality of lines connecting the camera assembly to the buoyant support to raise or lower the portion of the camera assembly.

19. The method of claim 17, comprising controlling the camera assembly using a remotely operated controller, the controller communicatively coupled to one or more cameras of the camera assembly.

20. The method of claim 17, comprising scanning the seabed using a stereo camera comprising a first field of vision and a second field of vision different than the first field of vision, wherein scanning the seabed comprises scanning using a second camera comprising a third field of vision different than the first field of vision and the second field of vision of the stereo camera.

* * * * *